UNITED STATES PATENT OFFICE.

AUGUST STOCK, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION.

YELLOWISH-GREEN PIGMENT DYES AND PROCESS OF MAKING SAME.

1,043,271. Specification of Letters Patent. Patented Nov. 5, 1912.

No Drawing. Application filed December 8, 1910. Serial No. 596,320.

*To all whom it may concern:*

Be it known that I, AUGUST STOCK, Ph. D., chemist, a citizen of the Empire of Germany, residing at Höchst-on-the-Main, Germany, have invented certain new and useful Improvements in Yellowish-Green Pigment Dyes and Processes of Making Same, of which the following is a specification.

For the preparation of pigment dyestuffs there are extensively used the tetramethyl- and tetraethyl-diamino-triphenylmethane dyes respectively which are commercially known by the names of malachite-green and brilliant-green. Now, as the most yellowish of these dyestuffs, namely brilliant-green, dyes tints of a rather blue hue, there has been hitherto a decided want of a dyestuff suitable for the production of the preferred yellower tints; and the attempt was made to obtain such tints by mixing the above said dyestuffs with yellow dyes, particularly with auramin. Now, I have found that the derivatives of the said dyestuffs obtainable from para-chlorobenzaldehyde are eminently suitable for supplying the said want. The color-lakes obtained therefrom are of such a pure tint that the aforesaid mixtures of brilliant-green and auramin are far from being able to compete with these lakes; moreover the dyestuffs offer all advantages possessed by a homogeneous product over a dyestuff mixture.

The preparation of the color-lakes from the dyestuffs is made by causing the dye solution to act upon a suspension of green-earth, i. e. a naturally-occurring magnesium-iron-aluminium-calcium-silicate, while well stirring, whereby insoluble yellowish-green lakes are precipitated which are compounds of the dyestuff with green-earth, remarkable for their extraordinary fastness to light and lime and their insolubility in water. The dyestuffs may also be precipitated by other precipitating agents, such as tannin, soaps, solutions of resin, potassium silicate or the like.

Having now described my invention, what I claim is:

1. The herein-described process of preparing yellowish-green color-lakes, which consists in precipitating the tetraalkyldiamino-p-chlorotriphenyl-methane dyestuffs, substantially as described.

2. As new products, the herein-described color-lakes, being compounds of the tetraalkyldiamino-p-chlorotriphenylmethane dyestuffs with precipitants, and being green powders of a bright tint, fast to water.

3. As a new product, the herein-described color-lake, being a green-earth compound of the tetraethyldiamino-p-chlorotriphenylmethane dyestuffs, and being a green powder of a bright tint, fast to water, lime and light.

In testimony whereof, I affix my signature in presence of two witnesses.

AUGUST STOCK.

Witnesses:
JEAN GRUND,
CARL GRUND.